US006700992B1

(12) United States Patent
Yu et al.

(10) Patent No.: US 6,700,992 B1
(45) Date of Patent: Mar. 2, 2004

(54) ADAPTIVE MESSAGE EMBEDDING ERROR DIFFUSION METHOD

(75) Inventors: Qing Yu, Rochester, NY (US); Chris W. Honsinger, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 621 days.

(21) Appl. No.: 09/615,494

(22) Filed: Jul. 13, 2000

(51) Int. Cl.[7] .................................................. G06K 9/00
(52) U.S. Cl. ...................................... 382/100; 358/3.28
(58) Field of Search ................................ 382/100, 232; 380/210, 216; 340/5.24, 5.26; 725/31; 348/460; 358/3.28; 713/176, 179

(56) References Cited

U.S. PATENT DOCUMENTS

| | | | | | |
|---|---|---|---|---|---|
| 5,396,559 | A | * | 3/1995 | McGrew | 380/54 |
| 5,790,703 | A | * | 8/1998 | Wang | 382/212 |
| 5,822,660 | A | | 10/1998 | Wen | 399/194 |
| 5,859,920 | A | * | 1/1999 | Daly et al. | 382/115 |
| 5,875,249 | A | * | 2/1999 | Mintzer et al. | 380/54 |
| 5,946,414 | A | * | 8/1999 | Cass et al. | 382/183 |
| 5,949,055 | A | * | 9/1999 | Fleet et al. | 235/469 |
| 6,044,156 | A | | 3/2000 | Honsinger et al. | 380/54 |
| 6,092,732 | A | * | 7/2000 | Curry | 358/3.28 |
| 6,094,483 | A | * | 7/2000 | Fridrich et al. | 380/28 |
| 6,556,688 | B1 | * | 4/2003 | Ratnaker | 382/100 |
| 2001/0054150 | A1 | * | 12/2001 | Levy | 713/176 |

OTHER PUBLICATIONS

"Digital Signal Processing" by Alan V. Oppenheim and Ronald W. Schafer, Prentice–Hall, Inc. 1975, pp. 101–115.
"An Adaptive Algorithm for Spatial Greyscale" by R. W. Floyd and L. Steinberg, Proceedings of the Society for Information Display, vol. 17, p. 75, 1976.

* cited by examiner

*Primary Examiner*—Andrew W. Johns
*Assistant Examiner*—Shervin Nakhjavan
(74) *Attorney, Agent, or Firm*—Peyton C. Watkins

(57) ABSTRACT

A method of producing a halftoned digital image having an embedded message includes using a digital message and at least one digital carrier image to produce a scrambled message image, and halftoning the digital image employing an error diffusion process where noise is added to the digital image, the noise including the scrambled message image.

16 Claims, 3 Drawing Sheets

EMBEDDED MESSAGE
32
INPUT DIGITAL IMAGE
16
THRESHOLDING
10
HALFTONED DIGITAL IMAGE TO OUTPUT DEVICE
12
ERROR FEEDBACK
14

ADAPTIVE MESSAGE EMBEDDING ERROR DIFFUSION METHOD

FIELD OF THE INVENTION

This invention relates to embedding messages in a halftoned digital image with an error diffuison technique.

BACKGROUND OF THE INVENTION

Digital halftoning is a technique employing digital image processing to produce a halftoned input digital image from an input digital image. An input digital image normally consists of pixels of discrete values typically ranging from 0 to 255. To reproduce this image on an output device capable of printing dots of one gray level (e.g. black), it is necessary to convert the input digital image to a halftoned digital image using some form of halftoning techniques. Halftoning methods rely on the fact that an observer's eye will spatially average over some local area of the halftoned digital image so that intermediate gray levels can be created by turning some of the pixels "on" and some of the pixels "off" in some small region of the halftoned digital image. The fraction of the pixels that are turned on will determine the apparent gray level. Common prior art methods of digital halftoning include error diffusion and dithering (see R. Ulichney, "Digital Halftoning," MIT Press, Cambridge, Mass., 1987).

Error diffusion is an adaptive algorithm that produces patterns with different spatial frequency content depending on the input digital image value. FIG. 1 shows a prior art block diagram depicting a basic error diffusion technique. This technique is disclosed in more detail in "An Adaptive Algorithm for Spatial Greyscale," *Proceedings of the Society for Information Display*, volume 17, pp. 75, 1976 by R. W. Floyd and L. Steinberg. For purpose of illustration it will be assumed that the pixels of the input digital image span the range from 0 to 255. As shown in FIG. 1, the pixels of an input digital image are thresholded in block 10 to produce thresholded pixels. The block 10 provides a signal having a 0 for any pixel of the input digital image below the threshold, and a 255 for any pixel of the input digital image above the threshold. A difference signal generator 12 receives the signal representing the pixel of the input digital image from block 10 and also from the output of an adder 16, which will be discussed later. The difference signal generator 12 produces a difference signal representing the error introduced by the thresholding process. The difference signal is multiplied by a series of error feedback weights in a error feedback 14, and is provided to the adder 16 which adds the weighted difference signal to the nearby pixels that have yet to be processed. This insures that the arithmetic mean of the pixels of the halftone digital image is preserved over a local image region.

FIG. 2 illustrates how a typical error can affect neighboring pixels in a halftoned digital image. The halftoned digital image from error diffusion is generally considered to be of high quality, since most of the halftone noise is distributed in a high spatial frequency band where human visual sensitivity is relatively low.

An artifact that is typically associated with error diffusion halftoning technique is known as "worms." Worms are formed when the black or white pixels of a halftoned digital image appear to string together in an area that should be otherwise uniform. Uniform image regions of certain gray levels, i.e., highlight regions, are especially susceptible to "worm" artifacts.

One much desired requirement for the usage of digital images is the detection of the unauthorized use of copyrighted or personal images. For example, the professional photographers are greatly concerned about the illegitimate use of their copyrighted images in the recent years. As the use of Internet and digital imaging devices become more popular, this concern is increasingly shared by common consumers. One example of the methods developed for this purpose is disclosed in commonly assigned U.S. Pat. No. 5,822,660.

SUMMARY OF THE INVENTION

An object of the present invention is to efficiently halftone digital images while embedding messages in such halftoned digital images at the same time.

This object is achieved by a method of producing a halftoned digital image having an embedded message, comprising the steps of:

a) using a digital message and at least one digital carrier image to produce a scrambled message image; and b) halftoning the digital image employing an error diffusion process where noise is added to the digital image, the noise including the scrambled message image.

This object is further achieved by a method for embedding a message in a halftoned digital image, comprising the steps of:

a) receiving an input digital image having a plurality of pixels;

b) providing a digital message image having pixels representing the message to be embedded;

c) providing a digital carrier image which has a random distribution of pixel values;

d) using the digital message image and the digital carrier image to produce a scrambled message image; and e) halftoning the input digital image employing an error diffusion process where noise is added to the input digital image, the noise includes the scrambled message image, whereby the scrambled message image is embedded in the halftoned digital image.

ADVANTAGES

An advantage of the present invention is that the efficiency of halftoning an input digital images and embedding information in the halftoned digital image is improved. Information can be embedded in the halftoned digital image and "worm" artifacts can be minimized in the halftoned digital image at the same time.

The halftoned digital images can be printed or displayed. A feature of embedding messages in the printed or displayed images is that the messages can subsequently be extracted later for proofing the authentication of the image or for detecting the unauthorized use of the image.

DETAILED DESCRIPTION OF THE INVENTION

The present invention relates to apparatus for embedding messages in halftoned digital images. The halftoned digital images can be printed or displayed by a digital printer.

Figure 1:
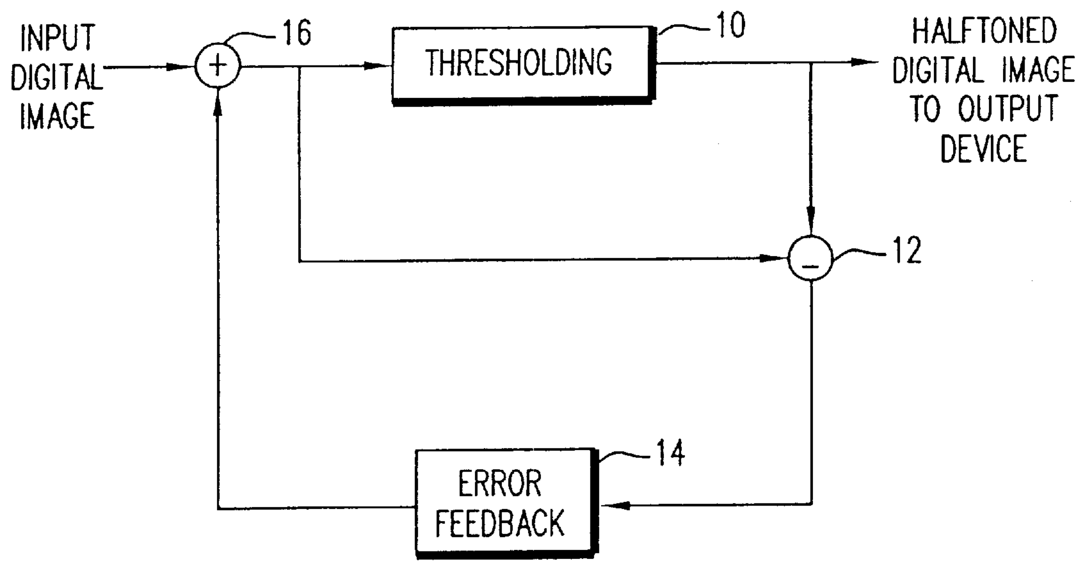
FIG. 1 shows a prior art block diagram of the Floyd-Steinberg error diffusion technique.
Figure 2:
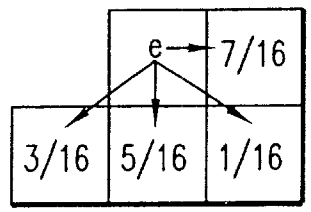
FIG. 2 shows a schematic diagram showing how a typical error can affect neighboring pixels in the prior art halftoned digital image produced by the Floyed-Steinberg error diffusion technique.
Figure 3:
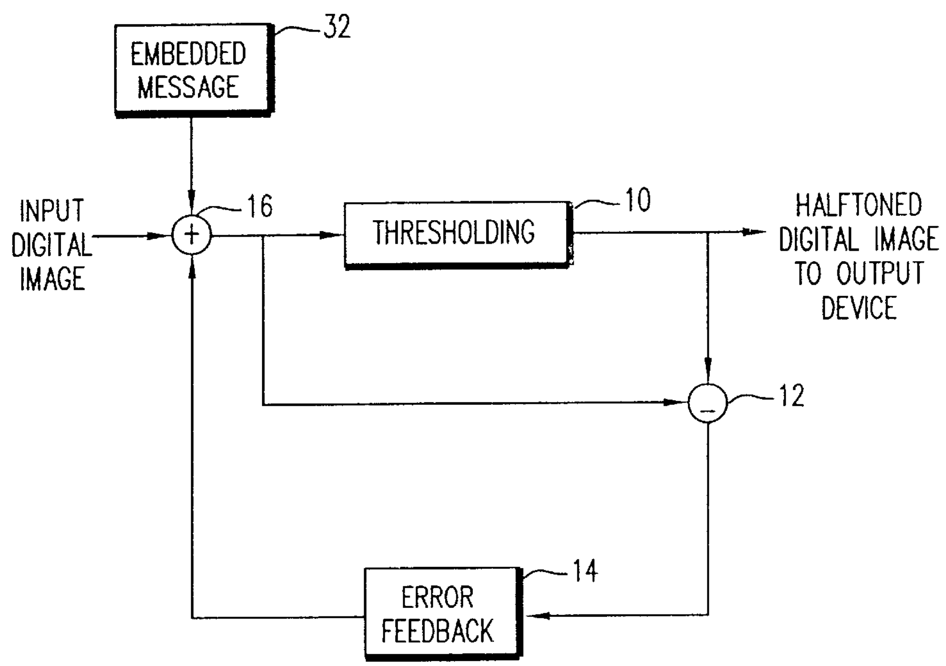
FIG. 3 shows an error diffusion technique in block diagram form in accordance with the present invention where the message image is added to the input digital image.

In accordance with the present invention, a digital message image embedding operation is integrated into the error diffusion halftoning operation as shown in block 32 in FIG. 3. The digital message image has pixels representing the message to be embedded. The digital message image is provided either by receiving the message or by forming the message. Typically, the input digital image I(x,y) is an N-bit gray scale image having a plurality of pixels, i.e., N is 8. The halftoned digital image O(x,y) carries the embedded message. The halftoned digital image O(x,y) has a bit depth of M-bit, wherein M is smaller than N. M can be equal to 1 (two levels) or greater than 1 (multiple levels).

The output of the block diagram of FIG. 3 is a halftoned digital image containing a message that is sent to an output device such as a digital printer or a display device. The halftoned digital image and message are used to control the amount of colorant to be transferred at each pixel on a receiver to produce a printed image, or form appropriately colored soft image on a display device.

In the present invention, the term "halftoning" refers to the image processing algorithm or operation that renders the illusion of the large number of gray levels of the input digital image by using a smaller number (two or more) of levels in the halftoned digital image. In the present invention, the term "halftoning" also refers to the commonly used terms "multiple halftoning", or "multitoning", that is halftoning with more than two output levels.

Figure 4:
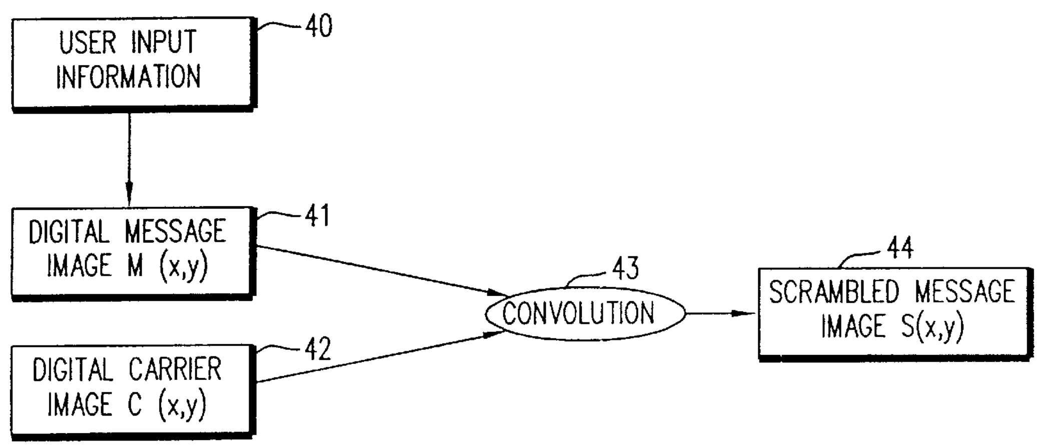
FIG. 4 is a flow diagram depicting a method in accordance with the present invention.
Figure 5:
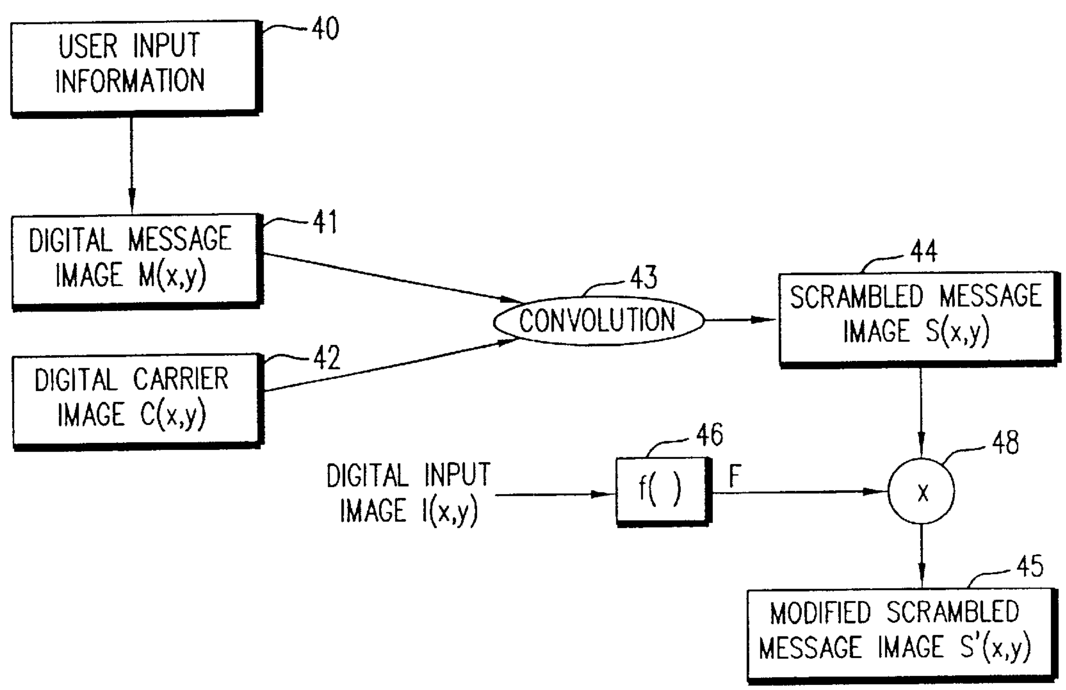
FIG. 5 is a flow diagram of another embodiment depicting a method in accordance with the present invention.

The message embedding process is now described in detail. Referring to FIG. 4, a digital carrier image C(x,y) is provided in block 42. The digital carrier image C(x,y) is $M_x$ pixels wide and $M_y$ pixels high. The digital carrier image has a random distribution of pixel values such that after its convolving with a digital message image M(x,y), the resulting scrambled message image will not be discernible to the human eyes. In the present invention, the random distribution of pixel values refers to the lack of regular patterns when the digital carrier image is displayed. The digital carrier image C(x,y) can be generated using a uniform or flat Fourier amplitude spectrum and a phase spectrum generated using a random number generator for each phase component, which is disclosed in Honsinger, et al., U.S. Pat. No. 6,044,156. As it is known in the art, the digital carrier image C(x,y) is dominated with "white noise".

A digital message image M(x,y) is next produced in block 41 using the user input information 40. The digital message image M(x,y), for example, can include alphanumeric or graphic information associated with the input digital image (scanned from the photographic film and/or input from the user). The message in the digital message image M(x,y) is visible and understandable by viewers. The digital message image M(x,y) is of the same size as the carrier image C(x,y).

The digital carrier image C(x,y) and the digital message image M(x,y) are then convolved in block 43 to form a scrambled message image S(x,y) 44:

$$S(x,y)=M(x,y)*C(x,y) \tag{1}$$

In Eqn. (1), the symbol "*" denotes the mathematical operation of convolution. In particular, a circular convolution can be efficiently performed in either space domain (image domain) or Fourier frequency domain representations for the present invention (see "Digital Signal Processing" by Alan V. Oppenheim and Ronald W. Schafer, Prentice-Hall, Inc., 1975, pgs. 101–115).

The digital message image M(x,y) 41, the digital carrier image C(x,y) 42 and the scrambled message image S(x,y) 44 are preferably smaller than the input digital image I(x,y) such that a plurality of the digital message images can be embedded into the input digital image I(x,y). For example, $M_x \times M_y$ can be 64×64, 128×128, and 256×256, all in the unit of pixels. The input digital image I(x,y) and the halftoned digital image O(x,y), for example, can have size of 3000×2000 pixels. The selection of $M_x$ and $M_y$ can also be dependent on the printing property (such as the format size of the printed image). The redundancy of embedded messages in the halftoned digital image O(x,y) increases the signal-to-noise ratio in the extraction of embedded message from the printed image. In case a part of the printed image is damaged or torn off, the redundancy of the embedded messages also ensures the embedded message can be extracted from just a small portion of the printed image.

The scrambled message image S(x,y) is further modified to generate a modified scrambled message image S'(x,y) 45 that has the same size as the input digital image I(x,y):

$$S'(x,y)=f(I(x,y))*S(x\%M_x,y\%M_y) \tag{2}$$

In Eqn. 2, "%" stands for a modular operator, which indicates that the scrambled message image will be tiled if necessary to cover the image plane of the input digital image. Function $f(\ )$ in block 46 adaptively generates a scaling factor F according to the corresponding pixel of the input digital image, which is then used in a multiplier 48 to scale a corresponding pixel of the scrambled message image S(x,y) to produce a corresponding pixel of the modified scrambled message S'(x,y). Typically, F has low amplitudes for input digital image pixels corresponding to gray levels that are sensitive to noise. This reduces noise visibility in the halftoned digital image at these gray levels.

The modified scrambled message image S'(x,y) is then added to the input digital image I(x,y), and thresholded in block 10 to produce a halftoned digital image O(x,y) having the embedded message. The thresholding error is further multiplied by a series of error feedback weights 14 and is provided to an adder 16 which adds the weighted difference signal to nearby pixels that have yet to be processed.

The halftoned digital image O(x,y) can next be sent by the computer to an output device for producing a visible image with an invisible embedded message. O(x,y) can be sent to a digital printer wherein a printed image can be produced, or to a display device wherein the image is displayed.

The visible image can be further digitized to produce a digitized image O'(x,y). The embedded message can be extracted from O'(x,y), or directly from O(x,y).

The digitized image O'(x,y) is cross correlated with a replica of the digital carrier image C(x,y) to produce an extracted message image M'(x,y), as described by the following:

$$M'(x,y)=O'(x,y) \otimes C(x,y) \approx M(x,y) \tag{3}$$

where $\otimes$ denotes the operation of a circular cross correlation.

The extracted message as described above can be displayed or printed for verifying the authenticity, the copyright of the printed or displayed image. The embedded message may include other image information or sound information associated with the image. The sound information can be played using sound translation programs.

A feature of the present invention is the addition of the message image to the digital image and then halftoning the message image with the noise.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

A computer program product may include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for practicing a method according to the present invention.

The invention has been described in detail with particular reference to certain preferred embodiments thereof, but it will be understood that variations and modifications can be effected within the spirit and scope of the invention. For example, in the preferred embodiment of this invention, the scrambled message image (or the modified scrambled message image) is the only noise source to the halftone process. However, extra noise of different characteristic and amplitude may also be added to the halftone process to improve quality of the halftoned digital image. Such modifications to the preferred embodiment do not significantly deviate from the scope of the present invention.

PARTS LIST

10 block
12 difference signal generator
14 error feedback
16 adder
32 block
40 user input information
41 digital message image
42 digital carrier image
43 convolution
44 scrambled message image
45 modified scrambled message image
46 scale factor generation module
48 multiplier

What is claimed is:

1. A method of producing a halftoned digital image having an embedded message, comprising the steps of:

a) using a digital message and at least one digital carrier image to produce a scrambled message image; and b) halftoning the digital image employing an error diffusion process where noise is added to the digital image, the noise including the scrambled message image.

2. The method of claim 1 further including modifying the scrambled message image according to the pixel values of the input digital image to produce a modified scrambled message image, such modified scrambled message image being added to the input digital image in the halftoning step instead of the scrambled message image.

3. The method of claim 1 further including the step of sending the halftoned digital image to an output device for producing a visible image with an invisible embedded message image.

4. The method of claim 3 wherein the output device is a halftone printer.

5. The method of claim 3 wherein the output device is a halftone soft display.

6. The method of claim 3 further including the step of extracting the message from the visible image.

7. The method of claim 6 wherein the extracting step includes digitizing the visible image to produce a digitized image, and correlating the digitized image with the digital carrier image to produce the message image.

8. The method of claim 1 wherein the using step includes convolving the digital message image and the digital carrier image to produce a scrambled message image.

9. A computer program product for performing the method of claim 1.

10. A method for embedding a message in a halftoned digital image, comprising the steps of:

a) receiving an input digital image having a plurality of pixels;

b) providing a digital message image having message pixels representing the message to be embedded;

c) providing a digital carrier image which has a random distribution of pixel values;

d) using the digital message image and the digital carrier image to produce a scrambled message image; and e) halftoning the input digital image employing an error diffusion process where noise is added to the input digital image, the noise includes the scrambled message image, whereby the scrambled message image is embedded in the halftoned digital image.

11. The method of claim 10 wherein the random distribution of pixel values of the digital carrier image is characterized by white noise.

12. A computer program product for performing the method of claim 10.

13. A method for halftoning an N-bit input digital image to produce a M-bit digital image, where M<N, the N-bit digital image including an embedded message, comprising the steps of:

a) receiving an input digital image having a plurality of N-bit pixels;

b) providing a digital message image having pixels representing the message to be embedded;

c) providing a digital carrier image which has a random distribution of pixel values;

d) convolving the digital message image and the digital carrier image to produce a scrambled message image; and e) halftoning the input digital image employing an error diffusion process where noise is added to the input digital image, the noise including the scrambled message image to produce an M-bit digital image.

14. The method of claim 13 wherein M is equal to 1.

15. The method of claim 13 wherein M is an integer greater than 1.

16. A computer program product for performing the method of claim 13.

* * * * *